United States Patent
Song et al.

(10) Patent No.: US 11,480,936 B2
(45) Date of Patent: Oct. 25, 2022

(54) SYSTEM AND METHOD FOR WIRELESSLY TRANSMITTING AND RECEIVING SAFETY INFORMATION

(71) Applicant: SILICON WORKS CO., LTD., Daejeon (KR)

(72) Inventors: Myoung Su Song, Daejeon (KR); Jae Wan Kim, Daejeon (KR); Il Kwon Kim, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 682 days.

(21) Appl. No.: 16/434,807

(22) Filed: Jun. 7, 2019

(65) Prior Publication Data
US 2019/0377313 A1 Dec. 12, 2019

(30) Foreign Application Priority Data
Jun. 8, 2018 (KR) .................. 10-2018-0065970
May 14, 2019 (KR) .................. 10-2019-0056354

(51) Int. Cl.
*G05B 19/042* (2006.01)
*H04L 67/12* (2022.01)

(52) U.S. Cl.
CPC .......... *G05B 19/0428* (2013.01); *H04L 67/12* (2013.01); *G05B 2219/2231* (2013.01); *G05B 2219/25257* (2013.01)

(58) Field of Classification Search
None
See application file for complete search history.

(56) References Cited

U.S. PATENT DOCUMENTS

2006/0162986 A1* 7/2006 Disser ................. G06F 11/1633
180/402
2019/0111907 A1* 4/2019 Harata .................... G06F 11/00

FOREIGN PATENT DOCUMENTS

JP 6134397 B2 5/2017
KR 10-2014-0073949 A 6/2014

* cited by examiner

*Primary Examiner* — Sean Shechtman
(74) *Attorney, Agent, or Firm* — Harness, Dickey & Pierce, P.L.C.

(57) ABSTRACT

Disclosed is a system for transmitting and receiving safety information, which generates first safety information about a control target and second safety information representing the occurrence or not of an error in the control target by using one microcontroller. The system includes a first slave controller generating first safety information and second safety information by using sensing data obtained from a control target and a master controller receiving the first safety information and the second safety information from the first slave controller through a wireless channel. When an error occurs in the first slave controller, the first slave controller transmits the second safety information to a second slave controller, and the second slave controller transmits the second safety information, received from the first slave controller, to the master controller.

11 Claims, 14 Drawing Sheets

SYSTEM AND METHOD FOR WIRELESSLY TRANSMITTING AND RECEIVING SAFETY INFORMATION

CROSS-REFERENCE TO RELATED APPLICATIONS

This application claims the benefit of the Korean Patent Application Nos. 10-2018-0065970 filed on Jun. 8, 2018 and 10-2019-0056354 filed on May 14, 2019, which are hereby incorporated by reference as if fully set forth herein.

FIELD

The present disclosure relates to a system and method for transmitting and receiving safety information.

BACKGROUND

A system requiring safety uses a control apparatus which is configured with a slave controller and a master controller, for safely controlling a control target. The slave controller obtains safety information from the control target by sensing or monitoring the control target and transmits the obtained safety information to the master controller. The master controller checks a state of the control target or generates a control command appropriate for the control target, based on the safety information received from the slave controller.

In the control apparatus, when an error occurs in the slave controller, the master controller may not normally obtain the safety information about the control target, or there is a possibility that the master controller obtains abnormal safety information, causing a problem where it is unable to accurately control the control target.

In order to solve the above-described problem, a method where the slave controller is designed to include two or more microprocessors has been proposed. In this case, when an error occurs in one of the two or more microprocessors of the slave controller, the slave controller may transmit safety information to the master controller by using the other microcontroller, and thus, the master controller may accurately control the control target.

However, since the two or more microcontrollers are equipped in the slave controller, the internal design complexity of the slave controller increases, and moreover, the number of microcontrollers increases, causing an increase in the control cost of the control apparatus.

SUMMARY

Accordingly, the present disclosure is directed to providing a system and method for transmitting and receiving safety information that substantially obviate one or more problems due to limitations and disadvantages of the related art.

An aspect of the present disclosure is directed to providing a system and method for transmitting and receiving safety information, which generate first safety information about a control target and second safety information representing the occurrence or not of an error in the control target by using one microcontroller.

Another aspect of the present disclosure is directed to providing a system and method for transmitting and receiving safety information, which wirelessly transmit and receive safety information.

Another aspect of the present disclosure is directed to providing a system and method for transmitting and receiving safety information, which transmit and receive safety information about a first slave controller by using a second slave controller when an error occurs in the first slave controller.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a system for wirelessly transmitting and receiving safety information, the system including: a first slave controller generating first safety information and second safety information by using sensing data obtained from a control target; and a master controller receiving the first safety information and the second safety information from the first slave controller through a wireless channel, wherein when an error occurs in the first slave controller, the first slave controller transmits the second safety information to a second slave controller, and the second slave controller transmits the second safety information, received from the first slave controller, to the master controller.

In another aspect of the present disclosure, there is provided a method of wirelessly transmitting and receiving safety information, the method including: obtaining, by a first slave controller, first and second sensing data from a control target; generating, by the first slave controller, first safety information by converting the first sensing data into digital data and second safety information by comparing the second sensing data with a predetermined reference range; and transmitting, by the first slave controller, the first and second safety information to a master controller through a wireless channel when the first slave controller operates normally, and transmitting, by the first slave controller, the second safety information to the master controller through a second slave controller when an error occurs in the first slave controller.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Hereinafter, embodiments of the present disclosure will be described in detail with reference to the accompanying drawings.

Figure 1:
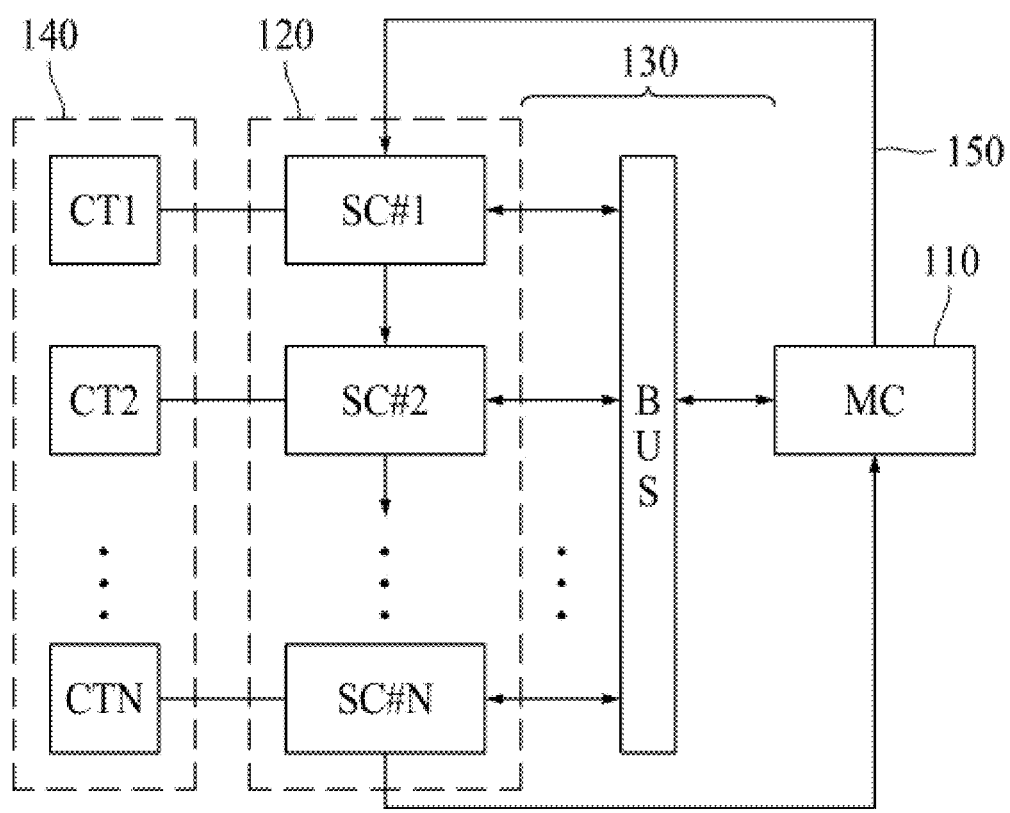
FIG. 1 is a block diagram illustrating a schematic configuration of a system for transmitting and receiving safety information by wire according to an embodiment of the present disclosure.

First, before describing a system for wirelessly transmitting and receiving safety information according to the present disclosure, a system for transmitting and receiving safety information by wire will be briefly described. FIG. 1 is a block diagram illustrating a schematic configuration of a system 100 for transmitting and receiving safety information by wire according to an embodiment of the present disclosure.

As illustrated in FIG. 1, the system 100 for transmitting and receiving safety information by wire may include a master controller (MC) 110 and a slave controller (SC) 120. In an embodiment, the slave controller 120 may be provided as N (where N is a natural number equal to or more than two) number, and for example, first to $N^{th}$ slave controllers SC #1 to SC #N may be provided.

The master controller 110 may be connected to the first to $N^{th}$ slave controllers SC #1 to SC #N through a first communication channel 130. In an embodiment, the first communication channel 130 may be a communication channel based on a controller area network (CAN) manner, a universal asynchronous receiver/transmitter (UART) manner, or a serial peripheral interface (SPI) manner. The master controller 110 may be connected to the first to $N^{th}$ slave controllers SC #1 to SC #N in parallel through the first communication channel 130.

When the first communication channel 130 is based on the CAN manner, the master controller 110 may communicate with the first to $N^{th}$ slave controllers SC #1 to SC #N through a bus line on the basis of CAN communication.

The master controller 110 may receive, through the first communication channel 130, first safety information about each of the first to $N^{th}$ slave controllers SC #1 to SC #N from the first to $N^{th}$ slave controllers SC #1 to SC #N. In an embodiment, the first safety information may include information which is associated with safety of a control target (CT) 140 and is obtained from the control target 140 by the first to $N^{th}$ slave controllers SC #1 to SC #N. For example, the first safety information may include a voltage, a current, a temperature, pressure, volume, a length, and a time of the control target 140.

The master controller 110 may be connected to the first to $N^{th}$ slave controllers SC #1 to SC #N through a second communication channel 150 physically separated from the first communication channel 130. In an embodiment, the master controller 110 may be serially connected to the first to $N^{th}$ slave controllers SC #1 to SC #N in a daisy chain manner. That is, the master controller 110 may be connected to the first to $N^{th}$ slave controllers SC #1 to SC #N in a ring structure as in FIG. 1.

The master controller 110 may receive, through the second communication channel 150, fault information via the first to $N^{th}$ slave controllers SC #1 to SC #N. The fault information may denote information representing the occurrence or not of an error in the control target 140. According to the present disclosure, even when the first safety information is not received from the first to $N^{th}$ slave controllers SC #1 to SC #N due to an error occurring in each of the first to $N^{th}$ slave controllers SC #1 to SC #N, the master controller 110 may check the occurrence or not of an error in the control target 140 by using the fault information received through the second communication channel 150.

In an embodiment, when first fault information is received through the second communication channel 150, the master controller 110 may determine that the control target 140 operates normally, and when second fault information is received, the master controller 110 may determine that the control target 140 does not normally operate.

Therefore, when the first safety information is not received through the first communication channel 130 and the first fault information is received through the second communication channel 150, the master controller 110 may determine that the control target 140 operates normally but an error occurs in each of the first to $N^{th}$ slave controllers SC #1 to SC #N.

Moreover, when the first safety information is received through the first communication channel 130 but the second fault information is received through the second communication channel 150, the master controller 110 may determine that an error occurs in the control target 140. In this case, the master controller 110 may additionally determine an arbitrary control target 140, where an error occurs, of a plurality of control targets 140 respectively connected to the first to $N^{th}$ slave controllers SC #1 to SC #N on the basis of the first safety information.

Moreover, when the first safety information is not received through the first communication channel 130 and the second fault information is received through the second communication channel 150, the master controller 110 may determine that an error occurs in each of the control target 140 and the first to $N^{th}$ slave controllers SC #1 to SC #N.

The first to $N^{th}$ slave controllers SC #1 to SC #N may transfer the first safety information to the master controller 110 through the first communication channel 130 and may transfer the fault information to the master controller 110 through the second communication channel 150.

Hereinafter, a slave controller according to an embodiment of the present disclosure will be described in more detail with reference to FIG. 2.

Figure 2:
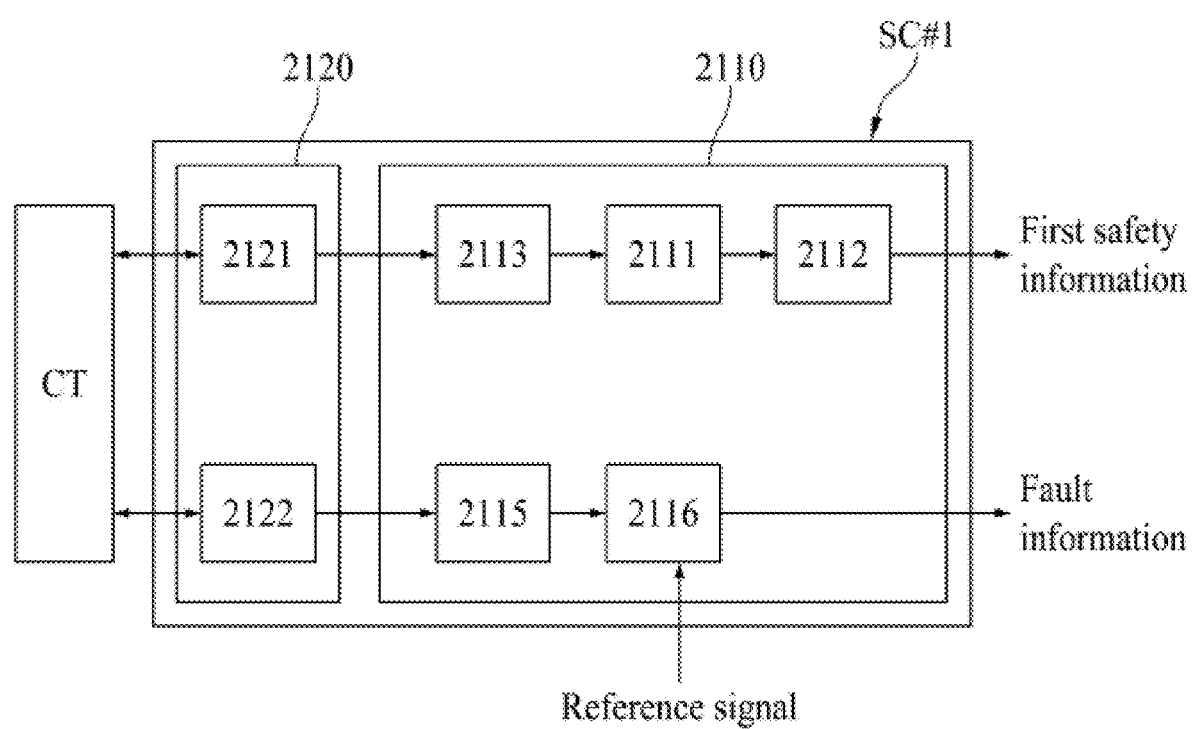
FIG. 2 is a block diagram schematically illustrating a configuration of a slave controller according to an embodiment of the present disclosure.

FIG. 2 is a block diagram schematically illustrating a configuration of a slave controller according to an embodiment of the present disclosure. All of the first to $N^{th}$ slave controllers SC #1 to SC #N illustrated in FIG. 1 may have the same configuration as a configuration illustrated in FIG. 2. Hereinafter, therefore, for convenience of description, a configuration of a slave controller will be described on the basis of the first slave controller SC #1 of the first to $N^{th}$ slave controllers SC #1 to SC #N.

Referring to FIG. 2, the first slave controller SC #1 may include a microcontroller (or microprocessor) 2110 and a sensing unit 2120. In FIG. 2, the first slave controller SC #1 is illustrated as including only the microcontroller 2110 and the sensing unit 2120, but this is merely for clearly describing a function of the first slave controller SC #1 corresponding to a feature of the present disclosure. The first slave controller SC #1 may further include other general elements for controlling a control target CT1.

Moreover, in FIG. 2, the first slave controller SC #1 is described as including the sensing unit 2120, but in a modified embodiment, the sensing unit 2120 may be configured independently from the first slave controller SC #1. Hereinafter, for convenience of description, a configuration of the first slave controller SC #1 will be described with reference to an example where the first slave controller SC #1 includes the sensing unit 2120.

The microcontroller 2110 may receive first sensing data and second sensing data from the sensing unit 2120. The microcontroller 2110 may generate first safety information on the basis of the first sensing data and may transmit the generated first safety information to the master controller 110 through the first communication channel 130.

Moreover, the microcontroller 2110 may generate second safety information on the basis of the second sensing data and may compare the generated second safety information with a reference signal received through the second communication channel 150 from the master controller 110 to generate fault information. The microcontroller 2110 may transmit the fault information to the second slave controller SC #2.

To this end, as illustrated in FIG. 2, the microcontroller 2110 may include a processing unit 2111, a communication module 2112, an analog-to-digital converter (ADC) 2113, a comparator 2115, and a fault information generator 2116.

The ADC 2113 may convert the first sensing data, received from the sensing unit 2120, into digital data and may output the digital data to the processing unit 2111. The processing unit 2111 may convert the first sensing data, converted into the digital data by the ADC 2113, into a communication packet appropriate for the first communication channel 130 to generate the first safety information. The processing unit 2111 may transmit the first safety information to the communication module 2112.

The processing unit 2111 may receive, through the communication module 2112, control information received from the master controller 110 and may control the first control target CT1 on the basis of the received control information. For example, when the first control target CT1 is a battery and control information about battery balancing is received from the communication module 2112, the processing unit 2111 may control charging or discharging of a corresponding battery on the basis of the control information about battery balancing, thereby maintaining balancing between batteries.

The communication module 2112 may transmit the first safety information, input from the processing unit 2111, to the master controller 110 through the first communication channel 130.

In the above-described embodiment, it has been described that the processing unit 2111 converts a format of the first sensing data to generate the first safety information, but in a modified embodiment, when the processing unit 2111 transmits the first sensing data converted into the digital data to the communication module 2112, the communication module 2112 may convert the first sensing data, converted into the digital data, into a communication packet suitable for the first communication channel 130 to generate the first safety information.

The comparator 2115 may receive the second sensing data from the sensing unit 2120, compare the second sensing data with a predetermined reference range, and transmit a comparison result to the fault information generator 2116.

The fault information generator 2116 may generate the second safety information on the basis of the comparison result of the comparator 2115. In detail, when it is determined by the comparator 2115 that the second sensing data is within the reference range, the fault information generator 2116 may generate the second safety information having a first level, and when it is determined by the comparator 2115 that the second sensing data is outside the reference range, the fault information generator 2116 may generate the second safety information having a second level.

For example, when the first control target CT1 is a battery, the second sensing data may be a battery voltage, a battery current, or a battery temperature, and the predetermined reference range may be a normal voltage range, a normal current range, or a normal temperature range.

For example, in a case where the second sensing data is the battery voltage and the predetermined reference range is the normal voltage range, when it is determined by the comparator 2115 that the second sensing data is within the predetermined reference range, the fault information generator 2116 may determine that a voltage of the battery which is the first control target CT1 is normal and may generate the second safety information having the first level.

However, when it is determined by the comparator 2115 that the second sensing data is less than a lower limit value of the predetermined reference range, the fault information generator 2116 may determine that the battery which is the first control target CT1 is over-discharged and may generate the second safety information having the second level. Also, when it is determined by the comparator 2115 that the second sensing data is greater than an upper limit value of the predetermined reference range, the fault information generator 2116 may determine that the battery which is the first control target CT1 is overcharged and may generate the second safety information having the second level.

When the second safety information is generated, the fault information generator 2116 may generate fault information by using the generated second safety information and the reference signal output from the master controller 110. In this case, the reference signal may be generated by the master controller 110 and may be the same value as the second safety information having the first level representing the nonoccurrence of a fault or may be fault information generated by another slave controller.

In an embodiment, when both the first safety information and the reference signal have the first level, the fault information generator 2116 may output first fault information, and when one of the first safety information and the reference signal has the second level, the fault information generator 2116 may output second fault information. In this case, the first fault information may have the same format as that of the second safety information having the first level, and the second fault information may have the same format as that of the second safety information having the second level.

Figure 3:
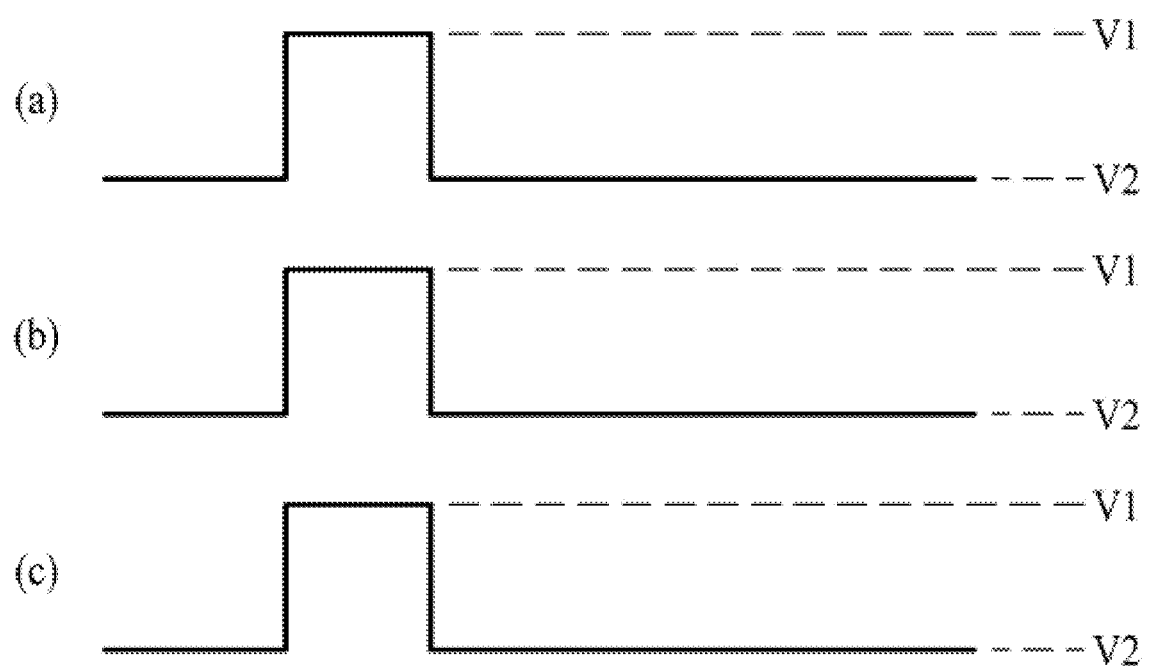
FIG. 3 is a diagram illustrating an example of generating fault information.

For example, when both the reference signal and the second safety information have a first level V1 representing the nonoccurrence of a fault as shown in FIGS. 3 (a) and (b), the fault information generator 2116 may generate the first fault information having the first level V1 representing the nonoccurrence of a fault as shown in FIG. 3 (c).

Figure 4:
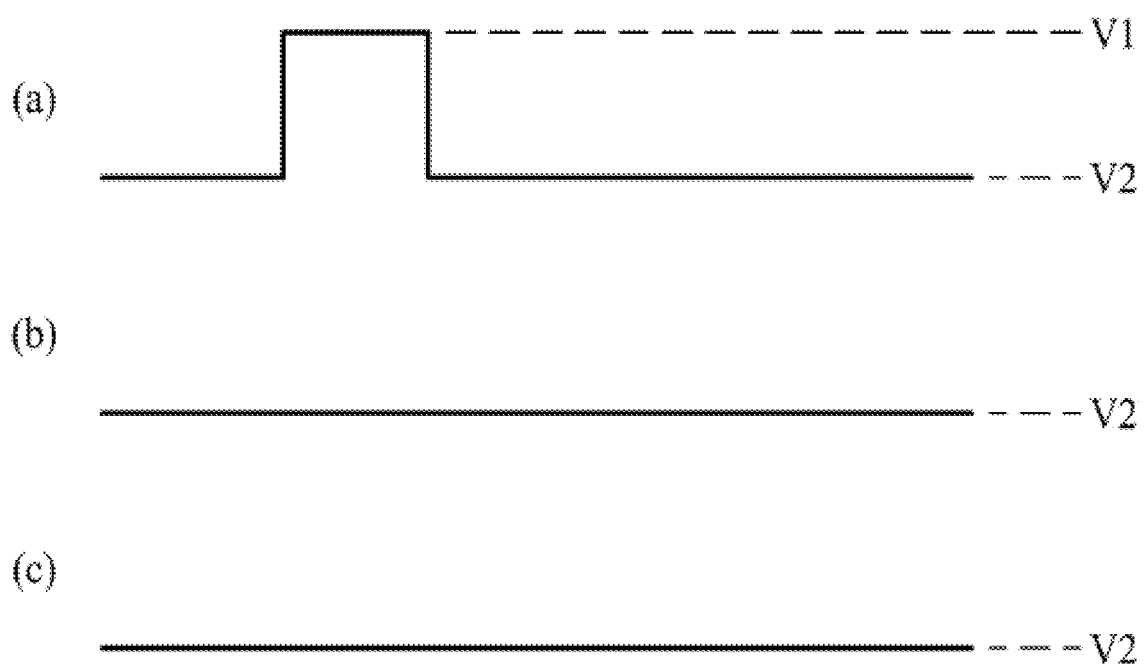
FIG. 4 is a diagram illustrating another example of generating fault information.

As another example, when the reference signal has the first level V1 representing the nonoccurrence of a fault as shown in FIG. 4 (a) and the second safety information has a second level V2 representing the occurrence of a fault as shown in FIG. 4 (b), the fault information generator 2116 may generate the second fault information having the second level V2 representing the occurrence of a fault as shown in FIG. 4 (c).

Referring again to FIG. 2, the sensing unit 2120 may include a first sensing unit 2121 and a second sensing unit 2122. The first and second sensing units 2121 and 2122 may respectively obtain the first and second sensing data from the first control target CT1.

The first sensing unit 2121 may obtain the first sensing data from the first control target CT1 and may transmit the obtained first sensing data to the ADC 2113. In an embodiment, the first sensing unit 2121 may transmit the first sensing data to the ADC 2113 in the form of differential signal by using two signal lines.

The second sensing unit 2122 may obtain the second sensing data from the first control target CT1 and may transmit the obtained second sensing data to the comparator 2115. In an embodiment, the second sensing unit 2122 may transmit the second sensing data to the comparator 2115 by using one signal line.

In this case, the first sensing data and the second sensing data may be the same values obtained from the first control target CT1. For example, when the first control target CT1 is a battery, each of the first sensing data and the second sensing data may be a voltage value or a temperature of the battery.

As described above, the first sensing data may be converted into the first safety information by the microcontroller 2110 and may be transmitted to the master controller 110 through the first communication channel 130, and the second sensing data may be converted into the fault information through the comparator 2115 and the fault information generator 2116 and may be transmitted to the second slave controller SC #2.

In the present disclosure, the reason that the first sensing data is transmitted in the form of differential signal by using two signal lines and the second sensing data is transmitted by using one signal line is because the first sensing data is a value which is used for the master controller 110 to analyze a characteristic (for example, cell balancing, a charging state (SoC), a lifetime state (SoH), safety information, etc.) of the first control target CT1, and thus, should be more accurately transmitted than the second sensing data.

Therefore, in the present disclosure, by transmitting the first sensing data to the ADC 2113 through two signal lines in the form of differential signal, the first sensing data may be transmitted as a more accurate value than a case of transmitting data through one signal line, and thus, system reliability may be enhanced. Also, by transmitting the second sensing data through one signal line, circuit complexity may be reduced, and moreover, the cost may decrease.

As described above, in the present disclosure, the master controller 110 may communicate with the plurality of slave controllers SC #1 to SC #N through a plurality of communication channels (for example, the first communication channel 130 and the second communication channel 150). Particularly, in the present disclosure, the first communication channel 130 may be used as a main communication channel for transmitting and receiving digital data such as the first safety information, and the second communication channel 150 may be used as a sub communication channel for receiving the fault information for checking the occurrence or not of an error in the control target 140.

Particularly, in the present disclosure, only simple components such as the comparator 2115 and the fault information generator 2116 may be added without adding a separate microcontroller, in order for the first to $N^{th}$ slave controllers SC #1 to SC #N to transmit the fault information through the second communication channel 150, thereby minimizing an increase in the manufacturing cost and increasing system stability.

Figure 5:
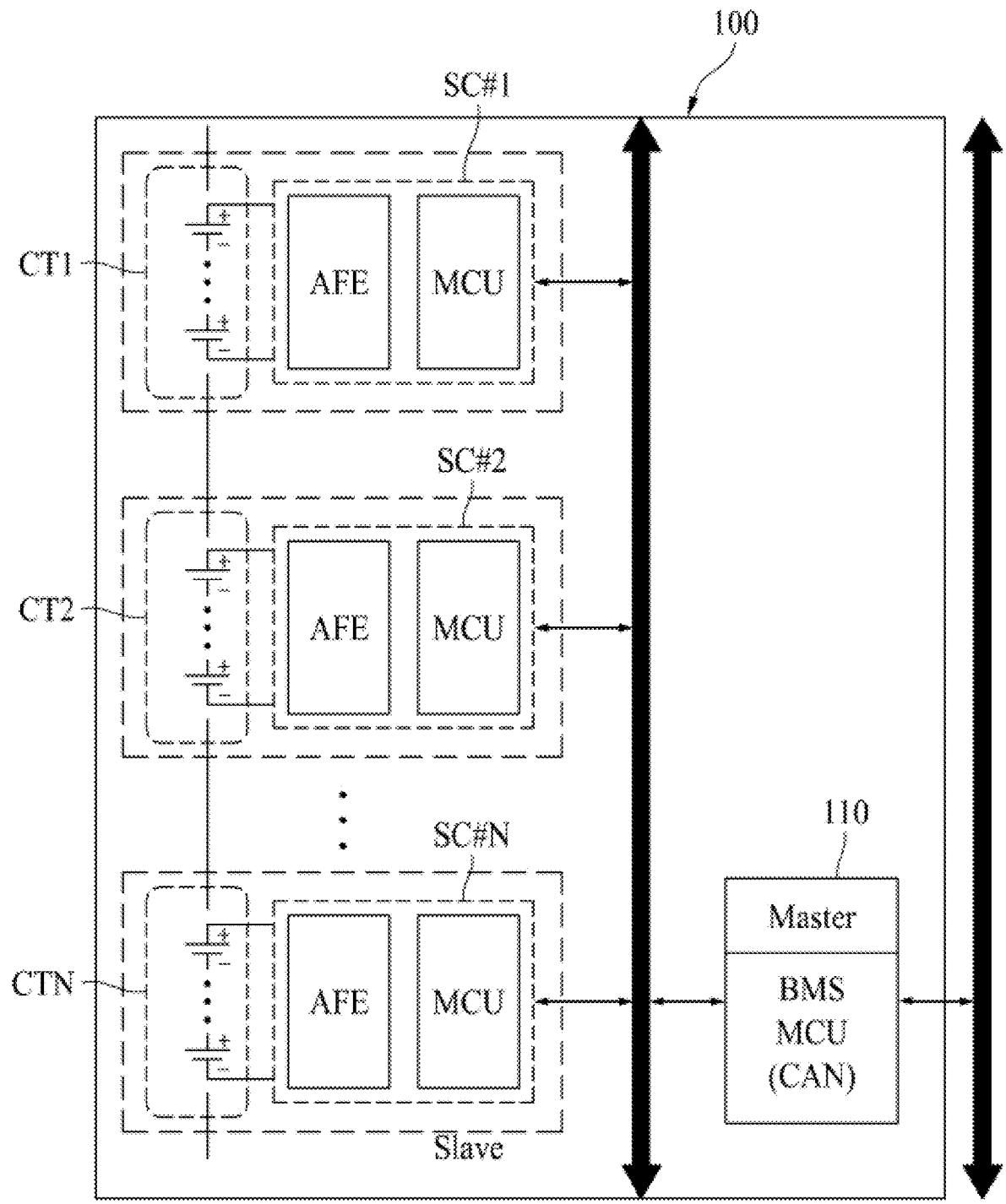
FIG. 5 is a diagram illustrating an example where the system for transmitting and receiving safety information by wire illustrated in FIG. 1 is applied to a battery management system.
Figure 6:
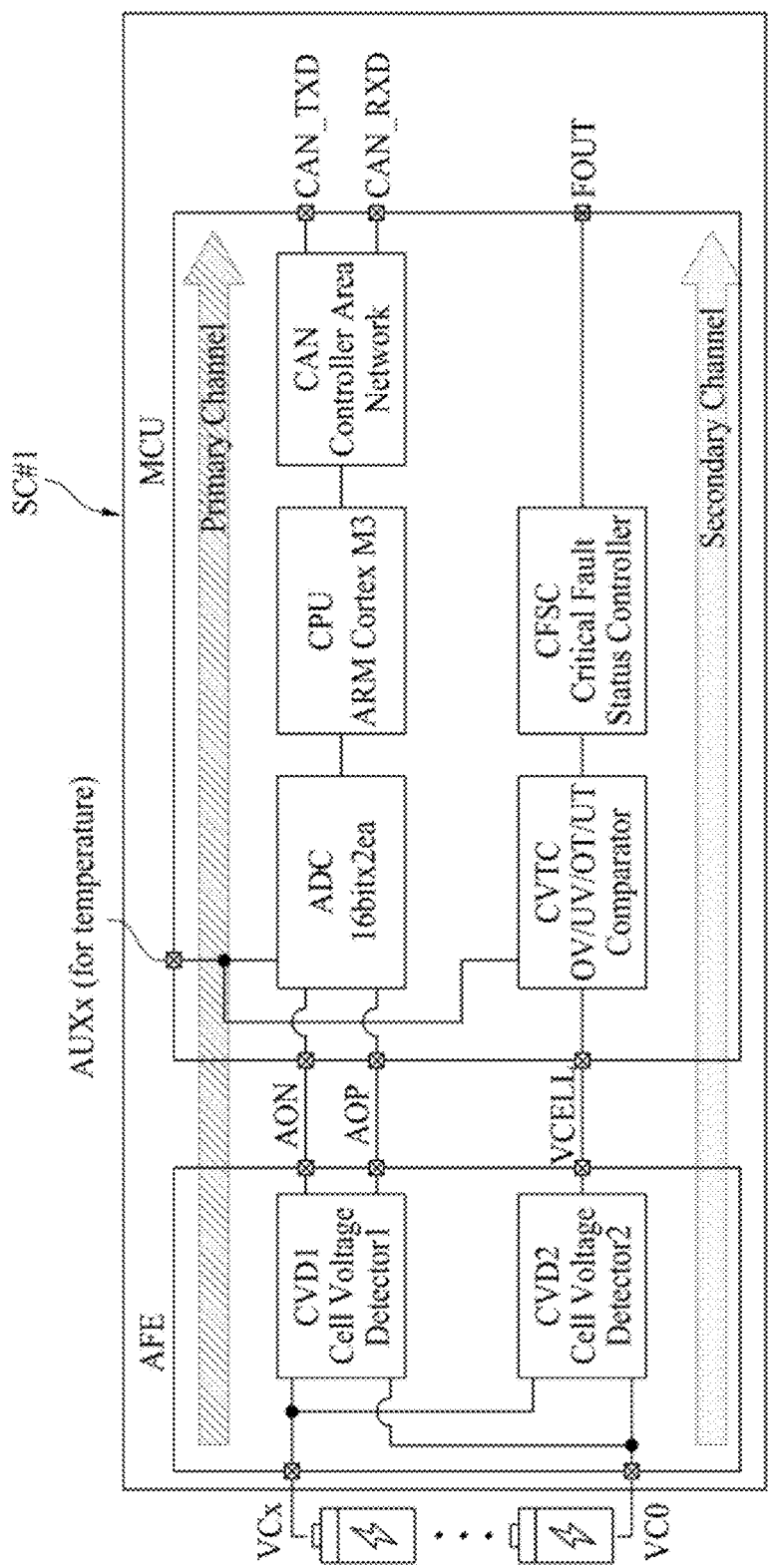
FIG. 6 is a diagram illustrating an example where the slave controller illustrated in FIG. 2 is applied to the battery management system.

In an embodiment, the system 100 for transmitting and receiving safety information by wire according to the present disclosure may be applied to a battery management system (BMS) as illustrated in FIGS. 5 and 6.

When the system 100 for transmitting and receiving safety information by wire according to the present disclosure is applied to the BMS, the first to $N^{th}$ slave controllers SC #1 to SC #N may generate a voltage or a temperature of a battery as safety information and may determine whether the voltage or the temperature is within a reference range, thereby generating fault information.

In FIGS. 5 and 6, AFE may represent the sensing unit 2120, MCU may represent the microcontroller 2110, CVD1 and CVD2 may respectively represent the first sensing unit 2121 and the second sensing unit 2122, ADC, CPU, and CAN may respectively represent the ADC 2113, the processing unit 2111, and the communication module 2112, and CVTC and CFSC may respectively represent the comparator 2115 and the fault information generator 2116. Particularly, the BMS to which the system 100 for transmitting and receiving safety information by wire according to the present disclosure is applied may be a BMS for electric vehicles.

In FIGS. 1 to 6, the system 100 for transmitting and receiving safety information by wire according to the present disclosure has been described above. Hereinafter, a system for wirelessly transmitting and receiving safety information according to the present disclosure will be described in detail with reference to FIGS. 7 to 11.

Figure 7:
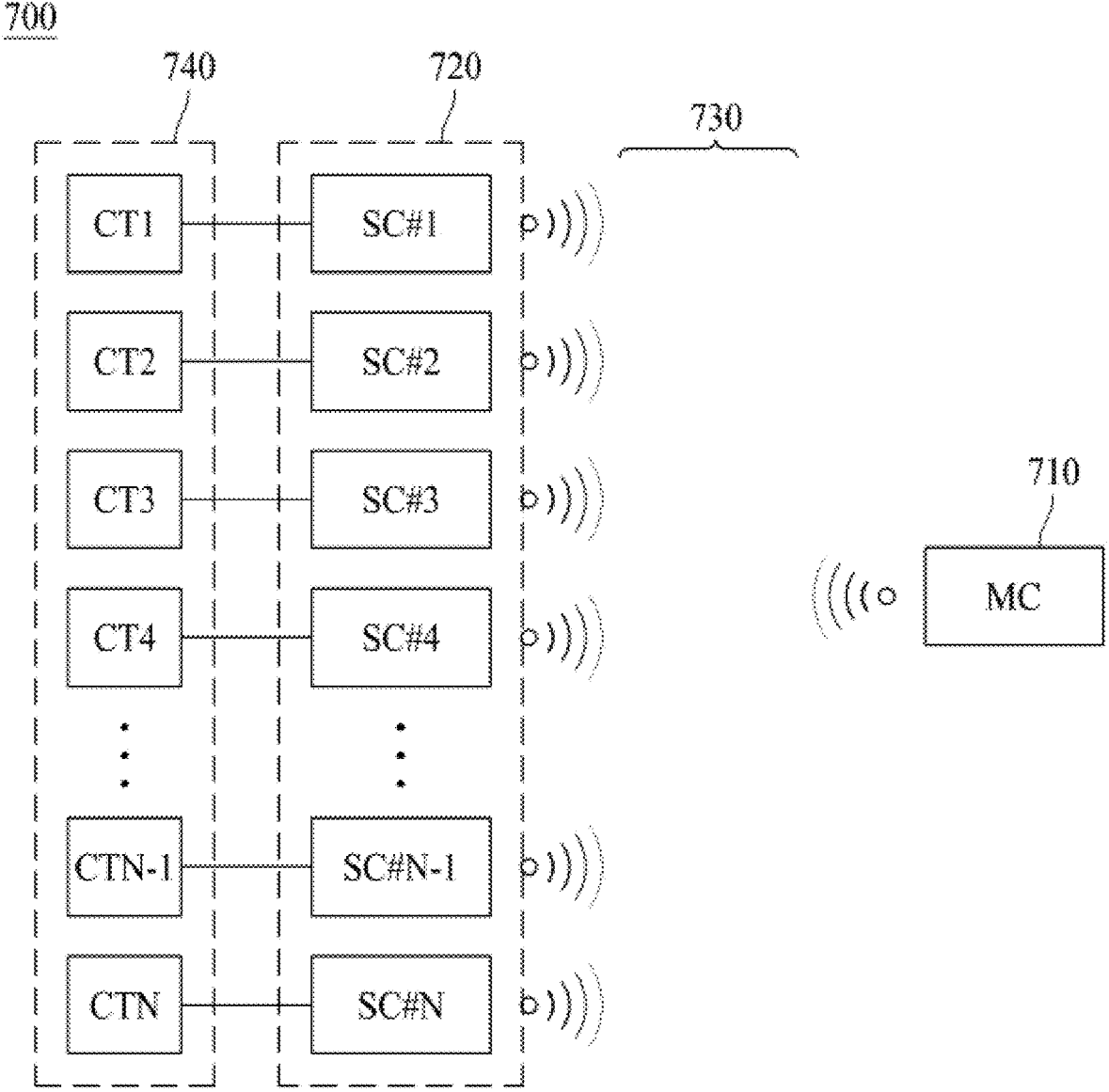
FIG. 7 is a block diagram illustrating a configuration of a system for wirelessly transmitting and receiving safety information according to an embodiment of the present disclosure.

FIG. 7 is a block diagram illustrating a configuration of a system 700 for wirelessly transmitting and receiving safety information according to an embodiment of the present disclosure. As illustrated in FIG. 7, the system 700 for wirelessly transmitting and receiving safety information may include a master controller (MC) 710 and a slave controller (SC) 720. In an embodiment, the slave controller 720 may be provided as N (where N is a natural number equal to or more than two) number, and for example, first to $N^{th}$ slave controllers SC #1 to SC #N may be provided.

The master controller 710 may receive, through a wireless channel 730, first safety information and second safety information about each of the first to $N^{th}$ slave controllers SC #1 to SC #N from the first to $N^{th}$ slave controllers SC #1 to SC #N.

In an embodiment, the first safety information may include information which is associated with safety of a control target 740 and is obtained from the control target 740 by the first to $N^{th}$ slave controllers SC #1 to SC #N. For example, the first safety information may include a voltage, a current, a temperature, pressure, volume, a length, and a time of the control target 740. Also, the second safety information may include information representing the occurrence or not of an error in the control target 740. For example, the second safety information may include information about whether the voltage or temperature of the control target 740 is outside a reference range.

In an embodiment, when an error occurs in one of the first to $N^{th}$ slave controllers SC #1 to SC #N, the master controller 710 according to the present disclosure may receive the second safety information about a slave controller, where the error occurs, through another slave controller where an error does not occur. To this end, a plurality of (for example, two) slave controllers may be mounted on one board.

As described above, even when an error occurs in one of the first to $N^{th}$ slave controllers SC #1 to SC #N, the master controller 710 according to the present disclosure may wirelessly receive the second safety information about a slave controller, where the error occurs, through another slave controller mounted on the same board on which the slave controller having the error is mounted, and thus, may check the occurrence or not of an error in the control target 740.

Hereinafter, a configuration of the master controller 710 according to the present disclosure will be described in detail with reference to FIG. 8.

Figure 8:
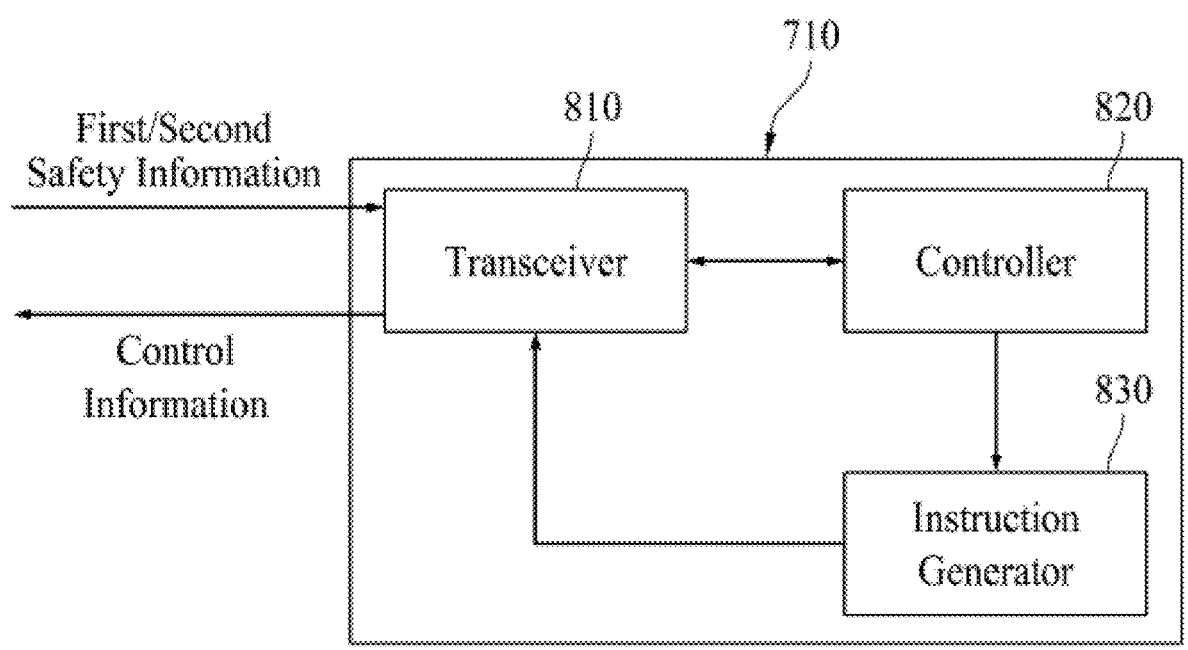
FIG. 8 is a block diagram schematically illustrating a configuration of a master controller illustrated in FIG. 6.

FIG. 8 is a block diagram schematically illustrating a configuration of a master controller 710 according to an embodiment of the present disclosure. As illustrated in FIG. 8, the master controller 710 according to an embodiment of the present disclosure may include a transceiver 810, a controller 820, and an instruction generator 830.

The transceiver 810 may receive the first safety information and the second safety information from each of the N slave controllers SC #1 to SC #N through the wireless channel 730 and may transfer the first safety information and the second safety information to the controller 820. Also, the transceiver 810 may receive control information from the controller 820 and may transmit the control information to the N slave controllers SC #1 to SC #N.

Particularly, when an instruction for requesting transmission of the second safety information about a slave controller having an error is received from the instruction generator 830, the transceiver 810 according to the present disclosure may transmit the received instruction to another slave controller mounted on the same board on which the slave controller having the error is mounted.

The controller 820 may analyze a characteristic of the control target 740 on the basis of the first safety information received through the transceiver 810. In detail, the controller 820 may monitor a state, such as a voltage or a temperature, of the control target 740 on the basis of the first safety information to analyze a characteristic (for example, cell balancing, a charging state (SoC), a lifetime state (SoH), safety information, etc.) of the control target 740.

Moreover, the controller 820 may determine the occurrence or not of errors in the first to $N^{th}$ slave controllers SC #1 to SC #N or the control target 740 on the basis of the second safety information received through the transceiver 810. In detail, when the second safety information is not received from the first to $N^{th}$ slave controllers SC #1 to SC #N during a predetermined period, the controller 820 may determine that an error occurs in a slave controller which does not transmit the second safety information.

According to an embodiment, the controller 820 may provide a determination result to the instruction generator 830, and thus, may allow the instruction generator 830 to generate an instruction for obtaining the second safety information about a slave controller where an error occurs. According to the present disclosure, even when the second safety information is not received from the first to $N^{th}$ slave controllers SC #1 to SC #N due to an error occurring in each of the first to $N^{th}$ slave controllers SC #1 to SC #N, the controller 820 may determine the occurrence or not of an error in the control target 740 on the basis of the second safety information received through another slave controller where an error does not occur and thus, the reliability of the system can be improved.

When the second safety information having the second level representing the occurrence of a fault in the control target 740 is received from the first to $N^{th}$ slave controllers SC #1 to SC #N, the controller 820 may determine that an error occurs in the control target 740 corresponding to the second safety information, and when the second safety information having the first level representing the nonoccurrence of a fault is received from the first to $N^{th}$ slave controllers SC #1 to SC #N, the controller 820 may determine that the control target 740 corresponding to the second safety information operates normally.

In addition, the controller 820 may generate control information for controlling the control target 740 on the basis of the first safety information and may transmit the generated control information to each of the first to $N^{th}$ slave controllers SC #1 to SC #N through the transceiver 820.

When it is determined by the controller 820 that there is a slave controller which does not transmit the second safety information, the instruction generator 830 may generate an instruction for obtaining the second safety information about a corresponding slave controller and may transmit the generated instruction to the transceiver 810, for obtaining the safety information about the corresponding slave controller.

In an embodiment, an instruction for obtaining the second safety information about a corresponding slave controller may include information (for example, identifier) about another slave controller mounted on the same board with the corresponding slave controller mounted thereon and a request for transmission of the second safety information about the corresponding slave controller. According to an embodiment, the transceiver 810 may accurately transmit, to the other slave controller, the instruction for obtaining the second safety information about the corresponding slave controller on the basis of the information about the other slave controller.

Referring again to FIG. 7, each of the first to $N^{th}$ slave controllers SC #1 to SC #N may generate the first safety information and the second safety information and may transmit the first safety information and the second safety information to the master controller 710 through the wireless channel 730.

Particularly, in the system for wirelessly transmitting and receiving safety information according to the present disclosure, when an error occurs in one of the first to $N^{th}$ slave controllers SC #1 to SC #N, instead of a slave controller having the error, a slave controller where an error does not occur may transmit the second safety information to the master controller 710.

Hereinafter, a configuration of a slave controller according to the present disclosure will be described in more detail with reference to FIG. 9.

Figure 9:
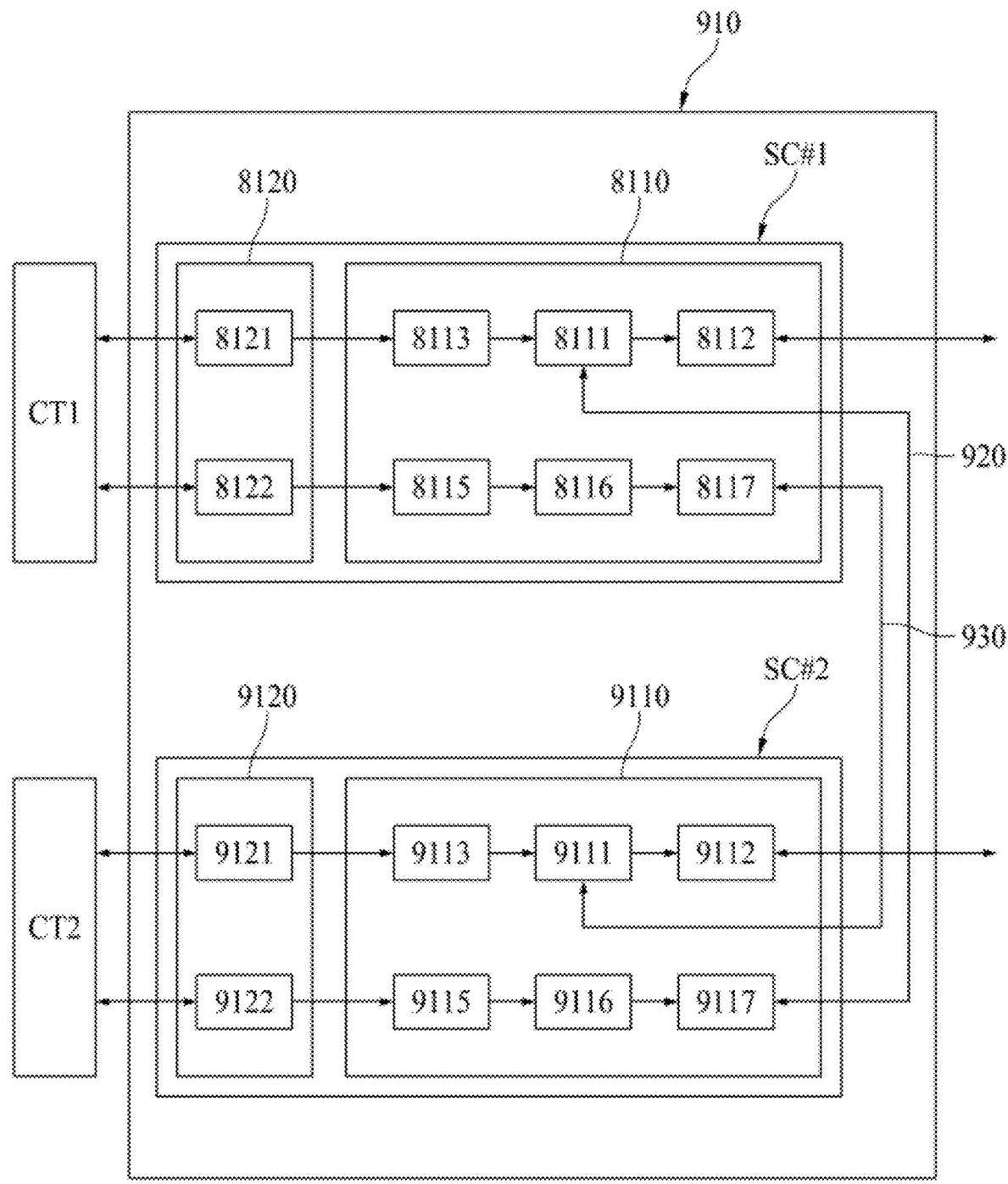
FIG. 9 is a block diagram schematically illustrating a configuration of a slave controller illustrated in FIG. 6.

FIG. 9 is a block diagram schematically illustrating a configuration of a slave controller according to an embodiment of the present disclosure. As illustrated in FIG. 9, a plurality of slave controllers (for example, two slave controllers SC #1 and SC #2) among the first to $N^{th}$ slave controllers SC #1-SC #N may be mounted on one board 910.

For example, as illustrated in FIG. 9, in a case where the first slave controller SC #1 and the second slave controller SC #2 are mounted on the one board 910, when an error occurs in the first slave controller SC #1, the second slave controller SC #2 may transmit the second safety information about the first slave controller SC #1 to the master controller 710, and when an error occurs in the second slave controller SC #2, the first slave controller SC #1 may transmit the second safety information about the second slave controller SC #2 to the master controller 710.

A function of the first slave controller SC #1 may be the same as that of the second slave controller SC #2. Hereinafter, therefore, for convenience of description, the function of the first slave controller SC #1 will be mainly described.

The first slave controller SC #1 may include a microcontroller 8110 and a sensing unit 8120. In FIG. 9, the first slave controller SC #1 is illustrated as including only the microcontroller 8110 and the sensing unit 8120, but this is merely for clearly describing the function of the first slave controller SC #1. The first slave controller SC #1 may further include other general elements for controlling a control target CT1.

Moreover, in FIG. 9, the first slave controller SC #1 is described as including the sensing unit 8120, but in a modified embodiment, the sensing unit 8120 may be configured independently from the first slave controller SC #1.

The microcontroller 8110 may receive first sensing data and second sensing data from the sensing unit 8120. The microcontroller 8110 may generate the first safety information on the basis of the first sensing data and may transmit the generated first safety information to the master controller 710 through the wireless channel 730.

Moreover, the microcontroller 8110 may generate the second safety information on the basis of the second sensing data. Particularly, if a second safety information transmission request for the first slave controller SC #1 is received from the second slave controller SC #2 when an error occurs in the first slave controller SC #1, the microcontroller 8110 according to the present disclosure may transmit the second safety information to the second slave controller SC #2, and thus, may allow the second safety information to be transmitted to the master controller 710 through the second slave controller SC #2.

Moreover, when a second safety information transmission request for the second slave controller SC #2 is received from the master controller 710, the microcontroller 8110 may request transmission of the second safety information from the second slave controller SC #2, obtain the second safety information about the second slave controller SC #2 from the second slave controller SC #2, and may transmit the obtained second safety information to the master controller 710.

The microcontroller 8110, as illustrated in FIG. 9, may include a processing unit 8111, an ADC 8113, a first communication module 8112, a comparator 8115, a second safety information generator 8116, and a second communication module 8117.

The ADC 8113 may convert the first sensing data, received from the sensing unit 8120, into digital data and may output the digital data to the processing unit 8111, and the processing unit 8111 may convert the first sensing data, converted into the digital data by the ADC 8113, into a communication packet appropriate for the wireless channel 730 to generate the first safety information. The processing unit 8111 may transmit the first safety information to the first communication module 8112.

The processing unit 8111 may receive, through the first communication module 8112, control information received from the master controller 810 and may control the first control target CT1 on the basis of the received control information. For example, when the first control target CT1 is a battery and control information about battery balancing is received from the first communication module 8112, the processing unit 8111 may control charging or discharging of a corresponding battery on the basis of the control information about battery balancing, thereby maintaining balancing between batteries.

Particularly, when a second safety information transmission request for the second slave controller SC #2 is received from the master controller 710, the processing unit 8111 may request the second safety information about the second slave controller SC #2 from the second slave controller SC #2 and may receive the second safety information about the second slave controller SC #2 from the second slave controller SC #2. The processing unit 8111 may convert the second safety information about the second slave controller SC #2 into a communication packet suitable for the wireless channel 730 and may transfer second safety information, converted into the communication packet, to the first communication module 8112.

In an embodiment, the processing unit 8111 of the first slave controller SC #1 and the second slave controller SC #2 may be connected to each other through a wired channel 920. For example, the processing unit 8111 of the first slave controller SC #1 and the second slave controller SC #2 may be connected to each other through an inter integrated circuit (I2C) bus 920 configured with a serial data (SDA) line and a serial clock (SCL) line. In this case, the processing unit 8111 of the first slave controller SC #1 may operate as an I2C master, and the second slave controller SC #2 may operate as an I2C slave.

In the above-described embodiment, the processing unit 8111 and the second slave controller SC #2 have been described above as being connected to each other through an I2C bus based on a 2-wire manner, but this is merely one embodiment. The processing unit 8111 and the second slave controller SC #2 may be connected to each other in a 1-wire interface manner.

The first communication module 8112 may transmit the first safety information input from the processing unit 8111, the second safety information about first slave controller SC #1 input from the second safety information generator 8116, or the second safety information about the second slave controller SC #2 to the master controller 710 through the wireless channel 730. Also, the first communication module 8112 may output the control information, transmitted from the master controller 710, to the processing unit 8111.

In the above-described embodiment, it has been described that the processing unit 8111 converts a format of the first sensing data to generate the first safety information, but in a modified embodiment, when the processing unit 8111 transmits the first sensing data converted into the digital data to the first communication module 8112, the first communication module 8112 may convert the first sensing data, converted into the digital data, into a communication packet suitable for the wireless channel 730 to generate the first safety information.

The comparator 8115 may receive the second sensing data from the sensing unit 8120, compare the second sensing data with a predetermined reference range, and transmit a comparison result to the second safety information generator 8116.

The second safety information generator 8116 may generate the second safety information on the basis of the comparison result of the comparator 8115. In detail, when it is determined by the comparator 8115 that the second sensing data is within the reference range, the second safety information generator 8116 may generate the second safety information having the first level, and when it is determined by the comparator 8115 that the second sensing data is outside the reference range, the second safety information generator 8116 may generate the second safety information having the second level.

For example, when the first control target CT1 is a battery, the second sensing data may be a battery voltage, a battery current, or a battery temperature, and the predetermined reference range may be a normal voltage range, a normal current range, or a normal temperature range.

For example, in a case where the second sensing data is the battery voltage and the predetermined reference range is the normal voltage range, when it is determined by the comparator 8115 that the second sensing data is within the predetermined reference range, the second safety information generator 8116 may determine that a voltage of the battery is normal and may generate the second safety information having the first level.

However, when it is determined by the comparator 8115 that the second sensing data is less than a lower limit value of the predetermined reference range, the second safety information generator 8116 may determine that the battery is over-discharged and may generate the second safety information having the second level. Also, when it is determined by the comparator 8115 that the second sensing data is greater than an upper limit value of the predetermined reference range, the second safety information generator 8116 may determine that the battery is overcharged and may generate the second safety information having the second level.

Although not shown, the second safety information generator 8116 may provide the generated second safety information to the first communication module 8112, and thus, may allow the second safety information to be transmitted to the master controller 710 through the wireless channel 730. In this case, the second safety information generator 8116 may convert the second safety information into a format suitable for the wireless channel 730 and may transmit the second safety information to the first communication module 8112.

As another example, the second safety information generator 8116 may provide the generated second safety information to the processing unit 8111, and thus, may allow the processing unit 8111 to convert the second safety information into a format suitable for the wireless channel 730 and to transmit the second safety information to the first communication module 8112.

As another example, the second safety information generator 8116 may provide the generated second safety information to the first communication module 8112, and thus, may allow the first communication module 8112 to convert the second safety information into a format suitable for the wireless channel 730 and to transmit the second safety information to the master controller 710.

When it is determined that an error occurs in the first slave controller SC #1, (for example, when it is determined that an error occurs in the first communication module 8112), the first slave controller SC #1 cannot transmit the first safety information and the second safety information to the master controller 710.

In order to overcome such a limitation, the microcontroller 8110 according to the present disclosure may include a second communication module 8117, for transmitting at least the second safety information to the master controller 710.

In detail, the second communication module 8117 may be connected to the second slave controller SC #2 (in more detail, a processing unit 9111 of the second slave controller SC #2) through a wired channel 930. For example, the second communication module 8117 may be connected to the processing unit 9111 of the second slave controller SC #2 through an I2C bus 930 configured with an SDA line and an SCL line. In this case, the second communication module 9117 of the first slave controller SC #1 may operate as an I2C slave, and the processing unit 9111 of the second slave controller SC #2 may operate as an I2C master.

First, when a second safety information transmission request for the first slave controller SC #1 is received from the processing unit 9111 of the second slave controller SC #2 through the I2C bus 930, the second communication module 8117 may transfer the second safety information about the first slave controller SC #1 to the processing unit 9111 of the second slave controller SC #2 through the I2C bus 930.

In the above-described embodiment, the second communication module 8117 and the processing unit 9111 of the second slave controller SC #2 have been described above as being connected to each other through the I2C bus based on the 2-wire manner, but this is merely one embodiment. The second communication module 8117 and the processing unit 9111 of the second slave controller SC #2 may be connected to each other in a 1-wire interface manner.

As described above, in the present disclosure, the first slave controller SC #1 may be connected to, through the second communication module 8117, the second slave controller SC #2 by wire, and when an error occurs in the first slave controller SC #1, the second safety information about the first slave controller SC #1 may be transmitted to the master controller 710 through the second slave controller SC #2, whereby the master controller 710 may check the presence of a normal operation of the first control target CT1 regardless of the occurrence or not of an error in the first slave controller SC #1.

Referring again to FIG. 9, the sensing unit 8120 may include a first sensing unit 8121 and a second sensing unit 8122. The first and second sensing units 8121 and 8122 may respectively obtain first and second sensing data from the first control target CT1.

The first sensing unit 8121 may obtain the first sensing data from the first control target CT1 and may transmit the obtained first sensing data to the ADC 8113. In an embodiment, the first sensing unit 8121 may transmit the first sensing data to the ADC 8113 in the form of differential signal by using two signal lines.

The second sensing unit 8122 may obtain the second sensing data from the first control target CT1 and may transmit the obtained second sensing data to the comparator 8115. In an embodiment, the second sensing unit 8122 may transmit the second sensing data to the comparator 8115 by using one signal line.

In this case, the first sensing data and the second sensing data may be the same values obtained from the first control target CT1. For example, when the first control target CT1 is a battery, each of the first sensing data and the second sensing data may be a voltage value of the battery.

In the present disclosure, the reason that the first sensing data is transmitted in the form of differential signal by using two signal lines and the second sensing data is transmitted by using one signal line is because the first sensing data is a value which is used for the master controller 710 to analyze a characteristic (for example, cell balancing, a charging state (SoC), a lifetime state (SoH), safety information, etc.) of the first control target CT1, and thus, should be more accurately transmitted than the second sensing data.

Therefore, in the present disclosure, by transmitting the first sensing data to the ADC 8113 through two signal lines in the form of differential signal, the first sensing data may be transmitted as a more accurate value than a case of transmitting data through one signal line, and thus, system reliability may be enhanced. Also, by transmitting the second sensing data through one signal line, circuit complexity may be reduced, and moreover, the cost may decrease.

As described above, in an embodiment of the present disclosure, even without an additional microcontroller being included in a slave controller, the second safety information for checking the occurrence or not of an error in the first control target CT1 may be generated by using only simple elements such as the comparator 8115 and the second safety information generator 8116, thereby minimizing an increase in cost and design complexity and increasing system stability. Particularly, in the present disclosure, the second safety information as well as the first safety information may be transmitted in a wireless manner, and thus, elements such as a bus line needed for wired communication may be omitted, thereby more decreasing an increase in cost and design complexity.

In an embodiment, like the system 100 for transmitting and receiving safety information by wire illustrated in FIG. 1, the system 700 for wirelessly transmitting and receiving safety information according to an embodiment of the present disclosure may be applied to the BMS. When the system 700 for wirelessly transmitting and receiving safety information according to an embodiment of the present disclosure is applied to the BMS, each of the plurality of slave controllers SC #1 to SC #N may generate a voltage or a temperature of a battery, which is the control target 740, as the first safety information and may determine whether the voltage or the temperature is within the reference range, thereby generating the second safety information. An example where the system 700 for wirelessly transmitting and receiving safety information according to an embodiment of the present disclosure is applied to the BMS is illustrated in FIGS. 10 and 11.

Figure 10:
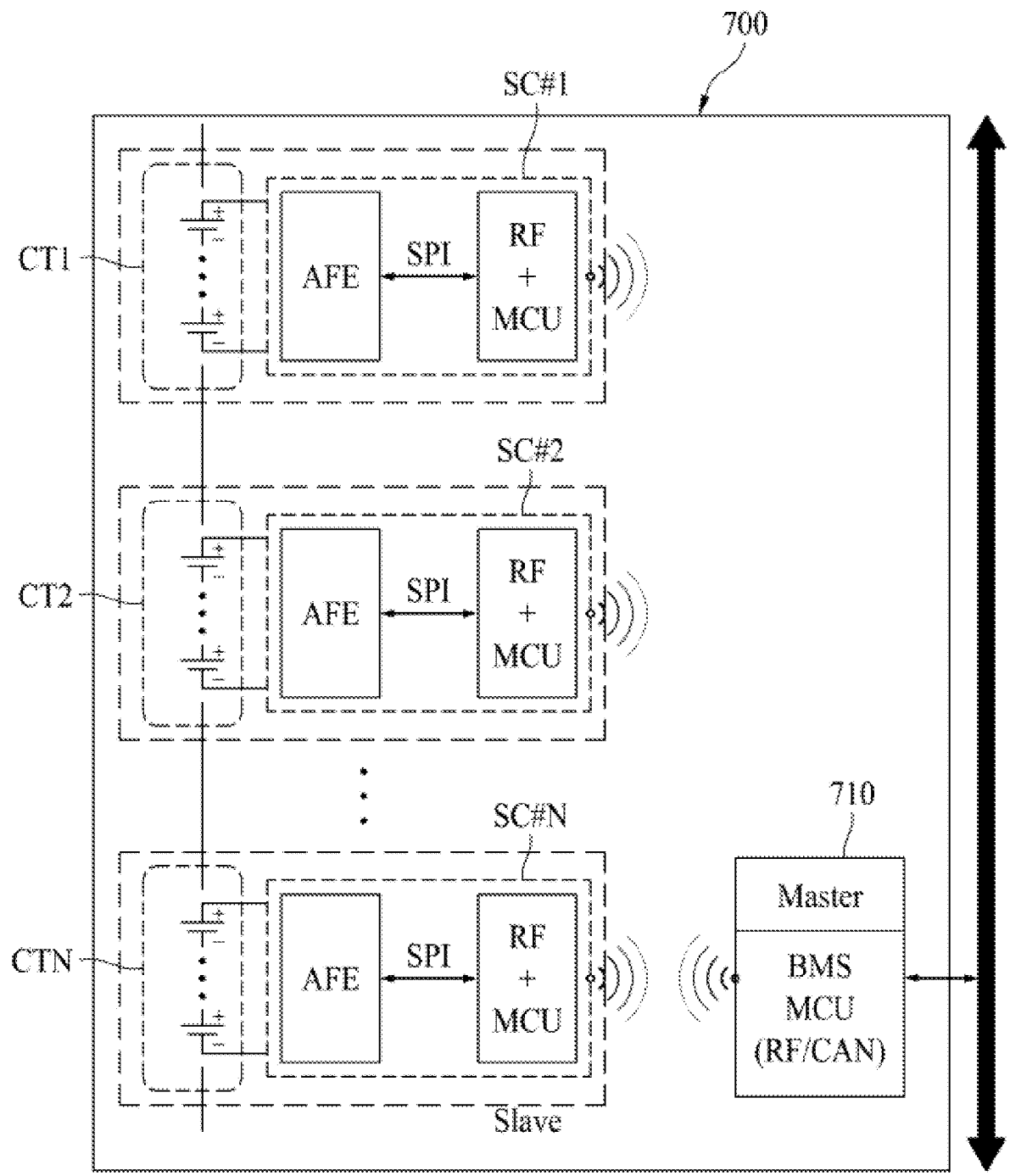
FIG. 10 is a diagram illustrating an example where the system for wirelessly transmitting and receiving safety information illustrated in FIG. 7 is applied to the battery management system.
Figure 11:
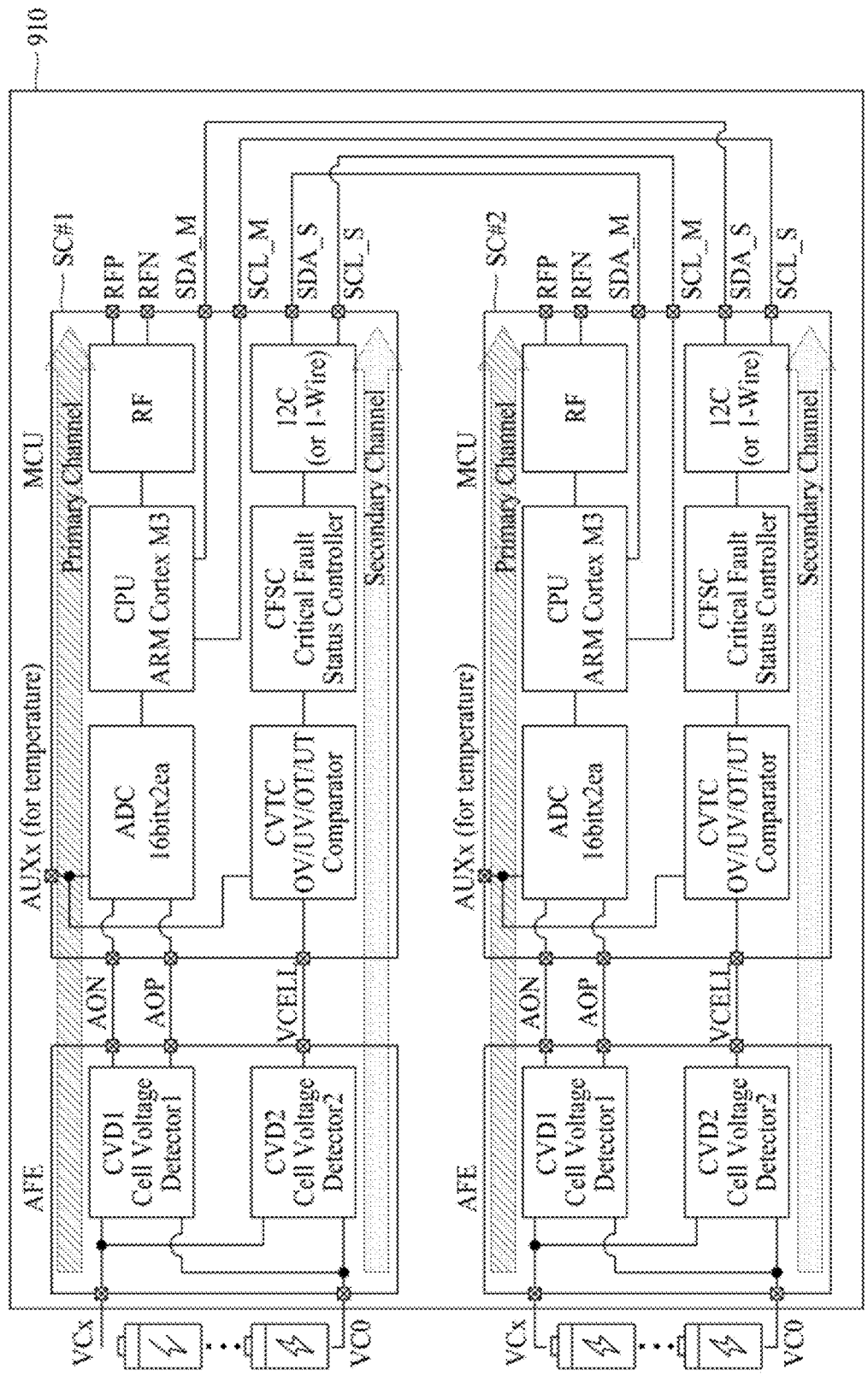
FIG. 11 is a diagram illustrating an example where the slave controller illustrated in FIG. 9 is applied to the battery management system.

In FIGS. 10 and 11, AFE may represent the sensing unit 8120, MCU may represent the microcontroller 8110, CVD1 and CVD2 may respectively represent the first sensing unit 8121 and the second sensing unit 8122, ADC, CPU, and RF may respectively represent the ADC 8113, the processing unit 8111, and the first communication module 8112, and CVTC, CFSC, and I2C may respectively represent the comparator 8115, the second safety information generator 8116, and the second communication module 8117.

Figure 12:
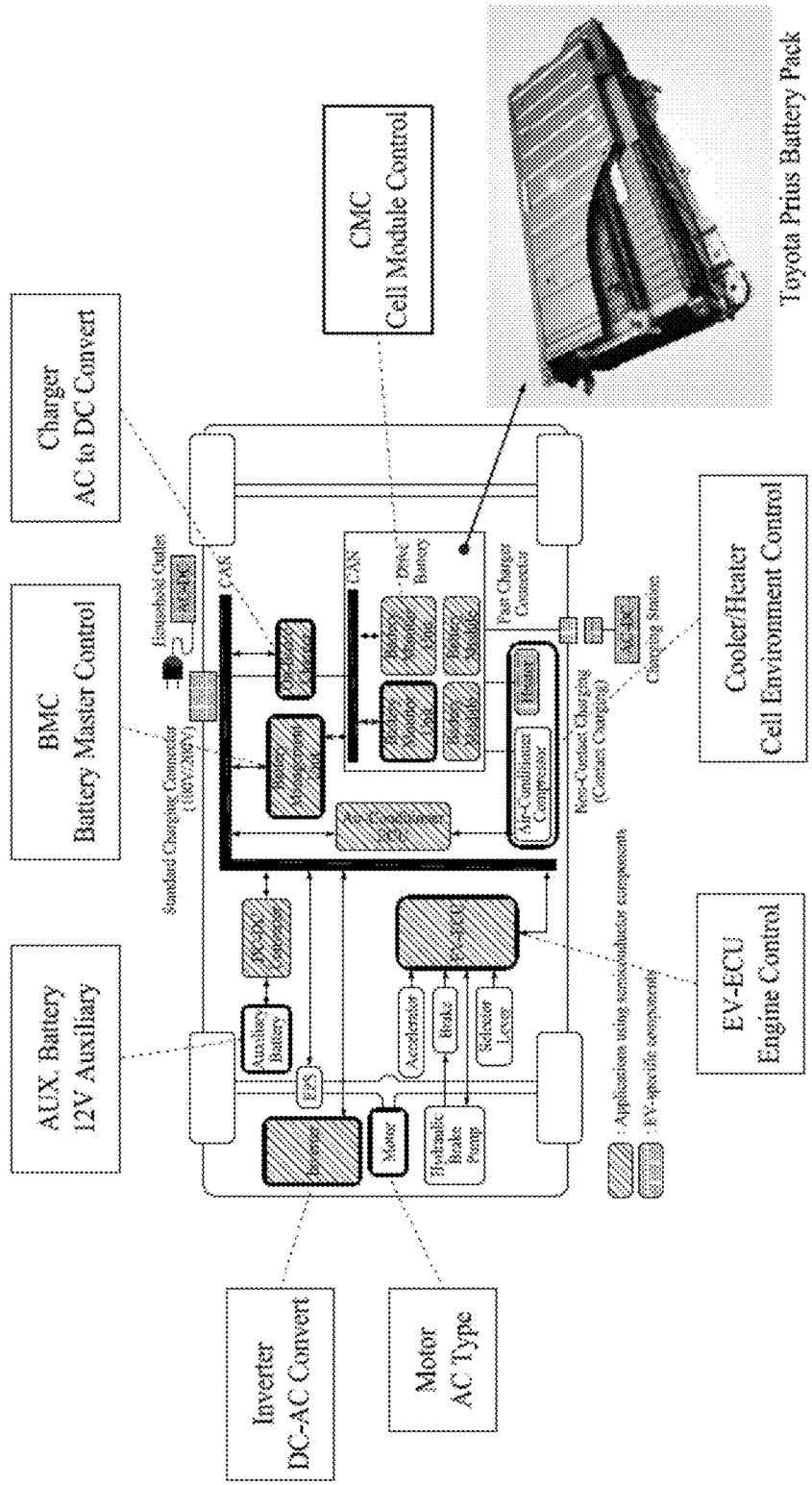
FIG. 12 is a diagram illustrating an example where the system for wirelessly transmitting and receiving safety information illustrated in FIG. 7 is applied to an electric vehicle.
Figure 13:
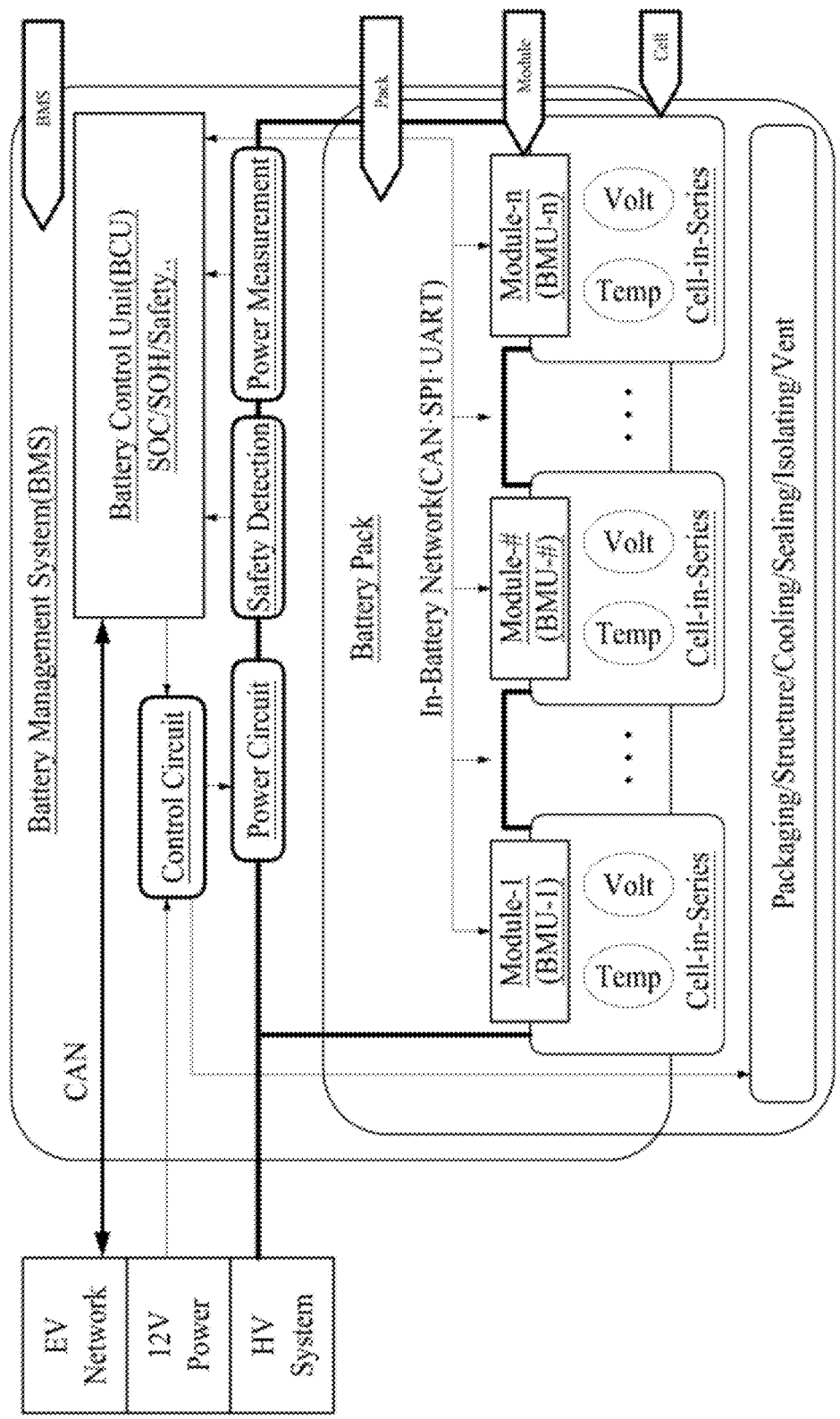
FIG. 13 is a diagram illustrating a configuration of a battery management system when the system for wirelessly transmitting and receiving safety information illustrated in FIG. 7 is applied to an electric vehicle.

Particularly, the BMS to which the system 700 for wirelessly transmitting and receiving safety information according to the present disclosure is applied may be a BMS for electric vehicles. A schematic configuration of an electric vehicle to which the system 700 for wirelessly transmitting and receiving safety information according to the present disclosure is applied is illustrated in FIG. 12, and a configuration of a BMS for electric vehicles to which the system 700 for wirelessly transmitting and receiving safety information according to the present disclosure is applied is illustrated in FIG. 13.

Figure 14:
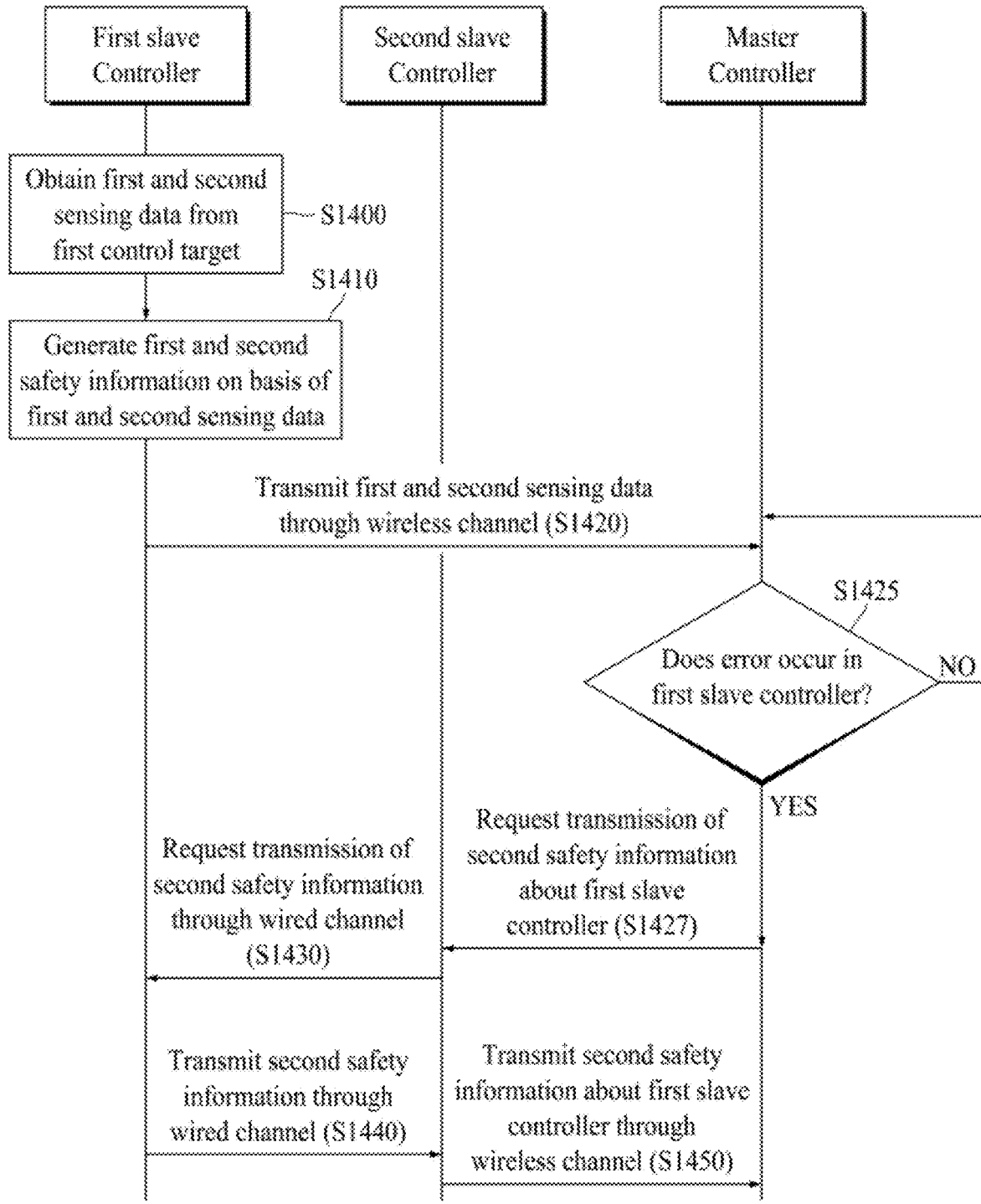
FIG. 14 is a flowchart illustrating a method of wirelessly transmitting and receiving safety information according to an embodiment of the present disclosure.

Hereinafter, a method of wirelessly transmitting and receiving safety information according to the present disclosure will be described. FIG. 14 is a flowchart illustrating a method of wirelessly transmitting and receiving safety information according to an embodiment of the present disclosure.

The method of wirelessly transmitting and receiving safety information illustrated in FIG. 14 may be performed by the system for wirelessly transmitting and receiving safety information illustrated in FIG. 7. Hereinafter, for convenience of description, an operation of the first slave controller SC #1 among operations of the slave controllers SC #1 to SC #N will be mainly described.

First, in step S1400, the first slave controller SC #1 may obtain the first and second sensing data from the first control target CT1. In an embodiment, when the first control target CT1 is a battery, the first and second sensing data may each be an output voltage, an output current, or a temperature of the battery.

In step S1410, the first slave controller SC #1 may generate the first and second safety information on the basis of the first and second sensing data. In detail, the first slave controller SC #1 may generate the first safety information on the basis of the first sensing data and may generate the second safety information on the basis of the second sensing data.

A method of generating, by the first slave controller SC #1, the first safety information on the basis of the first sensing data and a method of generating, by the first slave controller SC #1, the second safety information on the basis of the second sensing data have been described above in detail with reference to FIG. 9, and thus, their detailed descriptions are omitted.

In step S1420, the first slave controller SC #1 may transmit the first and second sensing data to the master controller 710 through a wireless channel.

In step S1425, the master controller 710 may determine the occurrence or not of an error in the first slave controller SC #1. In an embodiment, when the first safety information or the second safety information is not received from the first slave controller SC #1 during a predetermined period, the master controller 710 may determine that the error occurs in the first slave controller SC #1.

When it is determined that the error occurs in the first slave controller SC #1 since the second safety information is not received, the master controller 710 may request transmission of the second safety information about the first slave controller SC #1 from the second slave controller SC #2 mounted on the same board on which the first slave controller SC #1 is mounted in step S1427.

In step S1430, the second slave controller SC #2 may request transmission of the second safety information about the first slave controller SC #1 from the first slave controller SC #1 through a wired channel. In an embodiment, the wired channel may be an I2C bus configured with an SDA line and an SCL line.

Subsequently, the first slave controller SC #1 may transmit the second safety information thereof to the second slave controller SC #2 through the wired channel in step S1440, and the second slave controller SC #2 may transmit the second safety information about the first slave controller SC #1 to the master controller 710 through the wireless channel in step S1450.

Although not shown in FIG. 14, when it is determined that an error occurs in the second slave controller SC #2, the master controller 710 may request transmission of the second safety information about the second slave controller SC #2 from the first slave controller SC #1. In this case, the first slave controller SC #1 may request transmission of the second safety information about the second slave controller SC #2 from the second slave controller SC #2 through the wired channel, and when the second safety information about the second slave controller SC #2 is received from the second slave controller SC #2, the first slave controller SC #1 may transmit the second safety information about the second slave controller SC #2 to the master controller 710 through the wireless channel.

According to the present disclosure, one microcontroller may generate second safety information representing the occurrence or not of an error in a control target, in addition to first safety information about the control target, thereby decreasing the manufacturing cost and system design complexity.

Moreover, according to the present disclosure, since safety information is transmitted and received in a wireless manner, an element such as a data bus needed for transmitting safety information in a wired manner may be omitted, and thus, system design complexity may be more reduced.

Moreover, according to the present disclosure, when an error occurs in the first slave controller, safety information about the first slave controller may be wirelessly transmitted to the master controller through the second slave controller, thereby enhancing system stability and maximizing the reduction in system design complexity and the manufacturing cost All of the disclosed methods and procedures described in this disclosure can be implemented, at least in part, using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors or other hardware components which, when executing the series of computer instructions, perform or facilitate the performance of all or part of the disclosed methods and procedures.

The above-described feature, structure, and effect of the present disclosure are included in at least one embodiment of the present disclosure, but are not limited to only one embodiment. Furthermore, the feature, structure, and effect described in at least one embodiment of the present disclosure may be implemented through combination or modification of other embodiments by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A system for wirelessly transmitting and receiving safety information, the system comprising:
    a first slave controller configured to generate a second safety information by using sensing data obtained from a first control target;
    a master controller configured to receive the second safety information through a wireless channel when the first slave controller operates normally; and
    a second slave controller configured to receive the second safety information from the first slave controller when an error occurs in the first slave controller and transmit the second safety information, received from the first slave controller, to the master controller through the wireless channel,
    wherein the second slave controller is configured to generate the second safety information by using sensing data obtained from a second control target connected to the second slave controller and transmit the second safety information of the second slave controller to the master controller, the second control target different than the first control target, and
    wherein the second slave controller is configured to receive the second safety information of the first slave controller from the first slave controller when the error occurs in the first slave controller, and transmit the second safety information of the first slave controller on behalf of the first slave controller to the master controller through the wireless channel.

2. The system of claim 1, wherein the first slave controller comprises:
    a first sensing unit connected to the first control target to obtain first sensing data;
    a second sensing unit connected to the first control target to obtain second sensing data; and
    a microcontroller converting the first sensing data into digital data to generate a first safety information and comparing the second sensing data with a predetermined reference range to generate the second safety information,
    wherein the first slave controller transmits the first safety information to the master controller through the wireless channel.

3. The system of claim 2, wherein
    the first sensing unit transmits the first sensing data to the microcontroller in the form of differential signal by using a plurality of signal lines, and
    the second sensing unit transmits the second sensing data to the microcontroller by using one signal line.

4. The system of claim 2, wherein the microcontroller comprises:
    an analog-to-digital converter converting the first sensing data into the digital data;
    a processing unit converting the digital data into a communication packet based on the wireless channel to generate the first safety information;
    a second safety information generator generating second safety information having a first level representing the nonoccurrence of a fault when the second sensing data is within the predetermined reference range and generating second safety information having a second level representing the occurrence of a fault when the second sensing data is outside the predetermined reference range; and a first communication module transmitting the first safety information and the second safety information of the first slave controller to the master controller through the wireless channel.

5. The system of claim 4, wherein the microcontroller further comprises a second communication module transferring the second safety information of the first slave controller to the second slave controller through a wired channel when an error occurs in the first slave controller.

6. The system of claim 5, wherein
the second communication module and the second slave controller are connected to each other through a first inter integrated circuit (I2C) bus including a first serial data (SDA) line and a second serial clock (SCL) line, and
the second slave controller receives the second safety information of the first slave controller through the first I2C bus and transmits the received second safety information of the first slave controller to the master controller through the wireless channel.

7. The system of claim 4, wherein
the processing unit is connected to the second slave controller through a second inter integrated circuit (I2C) bus including a second serial data (SDA) line and a second serial clock (SCL) line,
the processing unit requests transmission of the second safety information of the second slave controller from the second slave controller when an error occurs in the second slave controller,
the processing unit converts the second safety information of the second slave controller into the communication packet based on the wireless channel when the second safety information of the second slave controller is received through the second I2C bus, and
the first communication module transmits the second safety information of the second slave controller to the master controller through the wireless channel.

8. The system of claim 1, wherein
the master controller requests for the second slave controller to transmit the second safety information of the first slave controller on behalf of the first slave controller when the second safety information of the first slave controller is not received from the first slave controller during a predetermined period, and
the master controller determines the occurrence or not of an error in the first control target connected to the first slave controller by using the second safety information of the first slave controller received through the second slave controller.

9. The system of claim 1, wherein the first control target and the second control target are a battery, and the sensing data comprises at least one of an output voltage and a temperature of the battery.

10. The system of claim 1, wherein
the first slave controller receives the second safety information of the second slave controller from the second slave controller when an error occurs in the second slave controller and transmits the second safety information of the second slave controller on behalf of the second slave controller to the master controller.

11. The system of claim 1, wherein the first and second slave controllers are mounted on one board.

* * * * *